United States Patent
Shih et al.

(10) Patent No.: US 9,983,752 B2
(45) Date of Patent: May 29, 2018

(54) PRESSURE DETECTION METHOD FOR IN-CELL TOUCH DISPLAY AND MOBILE DEVICE USING THE SAME

(71) Applicant: FocalTech Electronics, Ltd., Grand Cayman (KY)

(72) Inventors: Po-Sheng Shih, Grand Cayman (KY); Chien-Yung Cheng, Hsinchu (TW); Cheng-Tai Huang, Grand Cayman (KY)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 63 days.

(21) Appl. No.: 15/277,334

(22) Filed: Sep. 27, 2016

(65) Prior Publication Data

US 2017/0177141 A1 Jun. 22, 2017

Related U.S. Application Data

(60) Provisional application No. 62/268,508, filed on Dec. 17, 2015.

(51) Int. Cl.
 *G06F 3/044* (2006.01)
 *G06F 3/041* (2006.01)

(52) U.S. Cl.
 CPC ........... *G06F 3/044* (2013.01); *G06F 3/0412* (2013.01)

(58) Field of Classification Search
 CPC .... G06F 3/044; G06F 3/0412; G02F 1/13338; G09G 2300/023; G09G 3/20
 See application file for complete search history.

(56) References Cited

U.S. PATENT DOCUMENTS

| 2013/0057493 A1* | 3/2013 | Hwang | G06F 3/0418 |
| | | | 345/173 |
| 2014/0078104 A1* | 3/2014 | Lee | G06F 3/044 |
| | | | 345/174 |
| 2017/0068377 A1* | 3/2017 | Kim | G06F 3/0416 |

FOREIGN PATENT DOCUMENTS

| CN | 204759381 U | 11/2015 |
| CN | 204808288 U | 11/2015 |
| CN | 105117080 A | 12/2015 |
| TW | 201040820 A | 11/2010 |
| TW | 201331809 A | 8/2013 |

* cited by examiner

*Primary Examiner* — Ricardo L Osorio
(74) *Attorney, Agent, or Firm* — Muncy, Geissler, Olds & Lowe, P.C.

(57) ABSTRACT

A pressure detection method for an in-cell touch display and a mobile device using the same are provided. The pressure detection method comprises the steps of: providing a common voltage plane corresponding to touch sensing electrodes in the in-cell touch display; detecting capacitance values of the touch sensing electrodes; setting a first area and a second area according to a center of a touched portion when the in-cell touch display is determined as being touched, wherein the second area includes the first area; and excluding the capacitance values of the touch sensing electrodes in the first area, and using the capacitance values of the touch sensing electrodes in the second area to serve as a pressure detection value to determine a pressure exerted on the in-cell touch display.

10 Claims, 10 Drawing Sheets

PRESSURE DETECTION METHOD FOR IN-CELL TOUCH DISPLAY AND MOBILE DEVICE USING THE SAME

This application claims priority to U.S. Provisional Patent Application Ser. No. 62/268,508 filed on Dec. 17, 2015, which is incorporated herein by reference in its entirety.

BACKGROUND OF THE INVENTION

Field of the Invention

The invention relates to the technology of an in-cell touch display, and more particularly to a pressure detection method for an in-cell touch display and a mobile device using the same.

Description of the Related Art

The existing touch technology in the market is primarily based on the slight touch. The force touch is a new generation of touch technology. A pressure sensor is used so that various touch forces, such as a slight touch force and a heavily pressing force, at the same touch point on the touch panel enable wide functions or reactions.

FIG. 1 is a schematic view showing a conventional mobile device having a pressure sensing function. Referring to FIG. 1, the mobile device comprises an embedded touch display panel 10 and a mobile device equipment 11. The embedded touch display panel 10 comprises a display layer 101 and a touch sensing layer 102. The mobile device equipment 11 comprises a pressure sensing circuit 103. In this architecture, in order to sense the finger's downward pressing force, the pressure sensing circuit 103 must be added. The additionally added pressure sensing circuit 103 is used to sense the pressure. The pressure sensing circuit 103 detects the downward pressing force according to the deformations of the glass and the display.

The drawback of the architecture is that an additional pressure sensing circuit 103 is needed, and this is an obstacle against the reductions of the cost, product size and product weight.

SUMMARY OF THE INVENTION

An aspect of the present invention is to provide a pressure detection method for an in-cell touch display and a mobile device using the same, wherein the number of elements can be decreased, and the pressure detection can be performed using the originally existing sensor. Meanwhile, the objects of saving the manufacturing cost and the thinness and lightness of the end product can be achieved.

Accordingly, the present invention provides a pressure detection method for an in-cell touch display. The pressure detection method comprises the steps of: providing a common voltage plane corresponding to touch sensing electrodes in the in-cell touch display; detecting the capacitance values of the touch sensing electrodes; setting a first area and a second area according to a center of a touched portion when the in-cell touch display is determined as being touched, wherein the second area includes the first area; and excluding at least a portion of the capacitance values of the touch sensing electrodes in the first area, and using the capacitance values of the touch sensing electrodes in the second area to serve as a pressure detection value to determine a pressure exerted on the in-cell touch display.

The present invention further provides a mobile device. The mobile device comprises an in-cell touch display and an integrated driver and controller (IDC). The in-cell touch display comprises scan lines, touch sensing electrodes and a common voltage plane corresponding to the touch sensing electrodes. The IDC comprises pins coupled to the scan lines and the touch sensing electrodes, respectively. The IDC detects the capacitance values of the touch sensing electrodes. When the in-cell touch display is determined as being touched, the IDC sets a first area and a second area according to a center of a touched portion, wherein the second area includes the first area. The IDC excludes at least a portion of the capacitance values of the touch sensing electrodes in the first area, and uses the capacitance values of the touch sensing electrodes in the second area to serve as a pressure detection value to determine a pressure exerted on the in-cell touch display.

In the pressure detection method for an in-cell touch display and the mobile device using the same according to a preferred embodiment of the present invention, the method further includes: accumulating a deformation count value in every predetermined time after pressure detecting is performed; setting an upper bound count value according to the pressure detection value; determining whether the in-cell touch display is touched again before the deformation count value reaches the upper bound count value; setting the first area and the second area when the in-cell touch display is determined as being touched again according to the middle of the touched portion, wherein the second area includes the first area; excluding the capacitance values of the touch sensing electrodes in the first area, and using the capacitance values of the touch sensing electrodes in the second area to serve as the pressure detection value; providing a pressure gain value according to the deformation count value; and determining a pressure exerted on the in-cell touch display according to the pressure detection value and the pressure gain value.

The essence of the present invention is to determine pressure value of an external object pressing on the in-cell touch display by excluding an affect of touch capacitance of the external object such as a finger or other downward pressing object itself according to the capacitance change caused by the sensing electrode against the deformation amount of the common voltage plane. Thus, the present invention utilizes the sensing electrode to work in conjunction with the detection method of the present invention to detect the pressure of the external object pressing on the in-cell touch display, so that a 3D touch sensing can be further achieved without further adding a Z-axis sensing element.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

FIG. 6A is a schematic view showing values captured by the IDC 202 after the in-cell touch display 201 of the preferred embodiment of the present invention is pressed by the force of 500 grams.

FIG. 6B is a schematic view showing values captured by the IDC 202 after the in-cell touch display 201 of the preferred embodiment of the present invention is pressed by the force of 200 grams.

FIG. 6C is a schematic view showing values captured by the IDC 202 after the in-cell touch display 201 of the preferred embodiment of the present invention is pressed by the force of 10 grams.

DETAILED DESCRIPTION OF THE INVENTION

Figure 1:
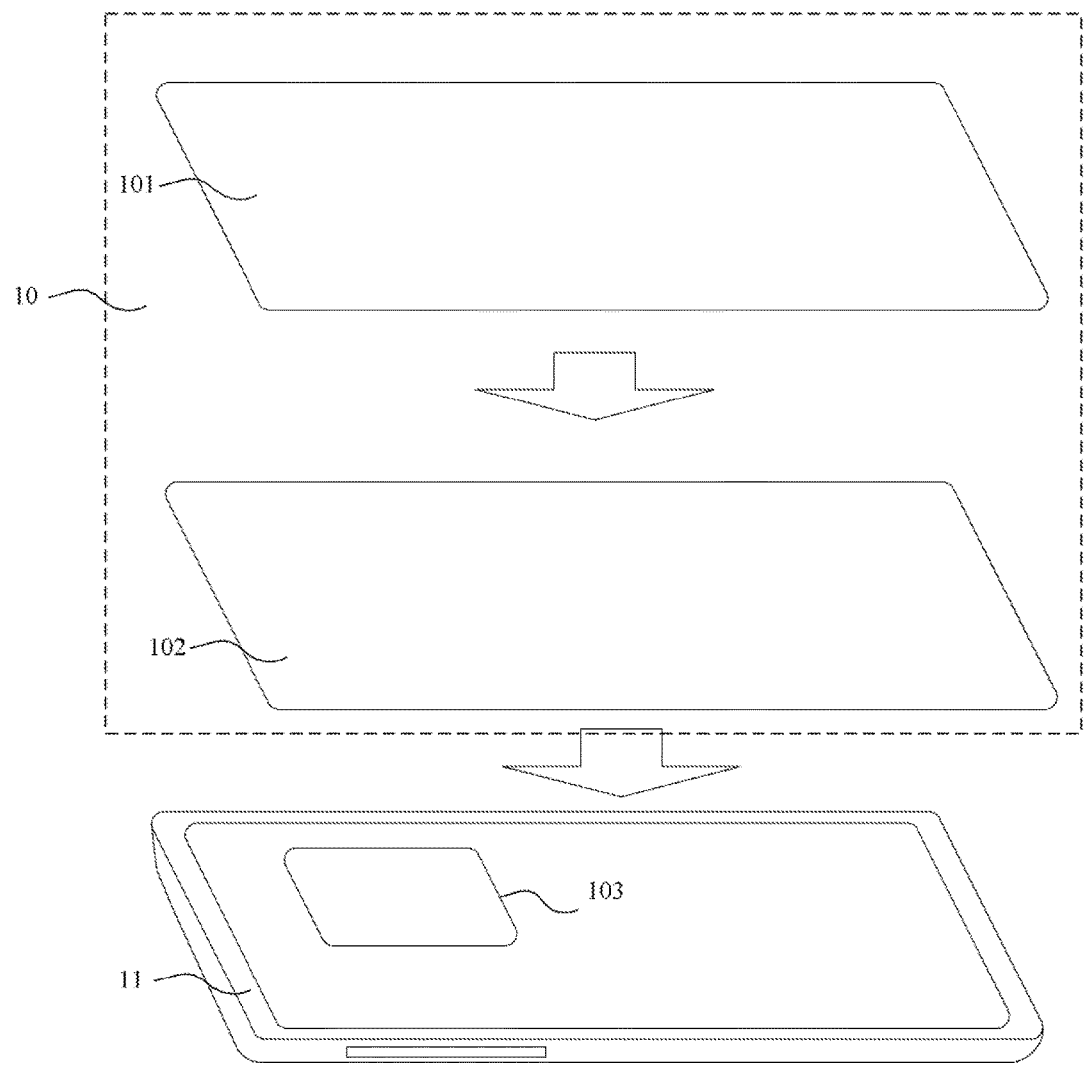
FIG. 1 is a schematic view showing a conventional mobile device having a pressure sensing function.
Figure 2:
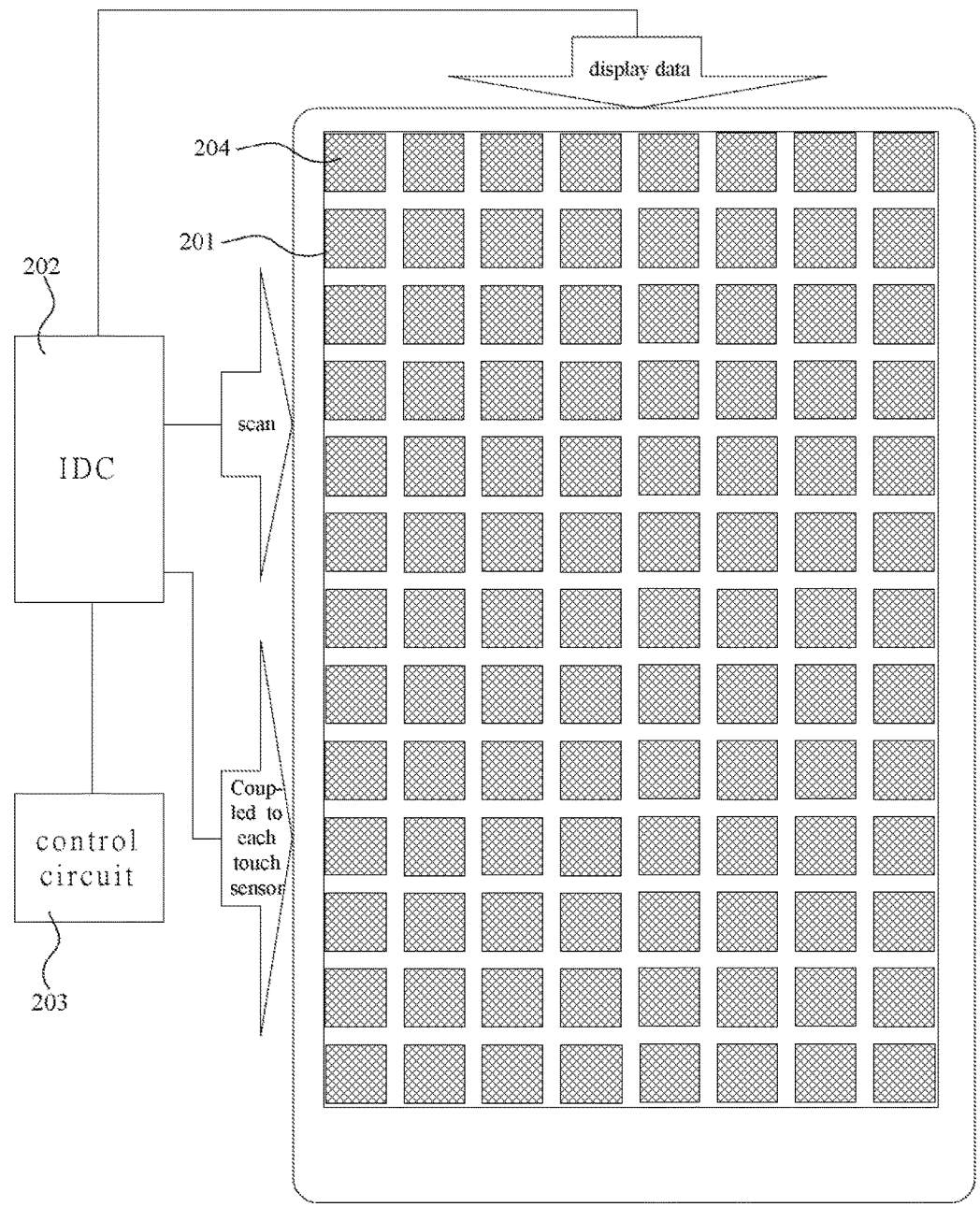
FIG. 2 is a circuit block diagram showing a mobile device according to a preferred embodiment of the present invention.

FIG. 2 is a circuit block diagram showing a mobile device according to a preferred embodiment of the present invention. Referring to FIG. 2, the mobile device of this embodiment comprises an in-cell touch display 201, an integrated driver and controller (IDC) 202 and a control circuit 203. The control circuit 203 controls the IDC 202 to display according to the user's operation. The in-cell touch display 201 comprises touch sensing electrodes 204. Each touch sensing electrode 204 is coupled to the IDC 202. In addition, the IDC 202 further drives the scan lines and the display data.

Figure 3:
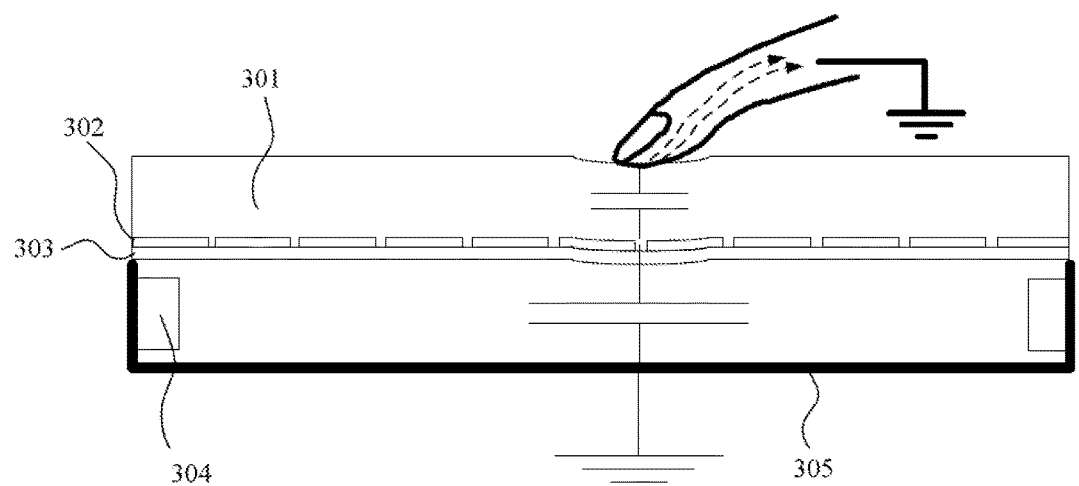
FIG. 3 is a schematic view showing the preferred embodiment of the present invention after an in-cell touch display 201 is pressed downwards.

FIG. 3 is a schematic view showing the preferred embodiment of the present invention after the in-cell touch display 201 is pressed downwards. Referring to FIG. 3, the in-cell touch display 201 of this embodiment comprises a protection glass layer 301, a touch sensing layer 302, a display panel layer 303, a backlight circuit 304 and a bezel of a liquid crystal display module (LCM bezel) 305. When the in-cell touch display 201 is pressed down, the touch sensing layer 302, the display panel layer 303 and the outer protection glass layer 301 deform downwards. The backlight circuit 304 is supported by the LCM bezel 305. In this embodiment, a reference voltage may be provided to the bezel 305, while the bezel 305 may serve as a pressure sensing layer. The reference voltage may be the ground or may be a DC voltage. In other embodiments, a copper foil or any other electroconductive layer may be used to serve as the pressure sensing layer.

When the touch sensing layer 302 is pressed down to deform, the touch sensing layer 302 senses the capacitance of the finger thereabove, and the distance between the touch sensing layer 302 and the LCM bezel 305 (reference voltage) also changes, as shown in FIG. 3. Thus, the capacitance values transferred from the touch sensing layer 302 back to the IDC 202 are also different due to different pressures. When different pressures are applied to press, in addition to the sensing of the capacitance variation value constituted by the finger, the distance between the touch sensing layer 302 and the LCM bezel 305 also changes with the increase of the pressure, so that the effective area formed by the capacitance variation value read from the touch sensing layer 302 by the IDC 202 also expands.

Figure 4:
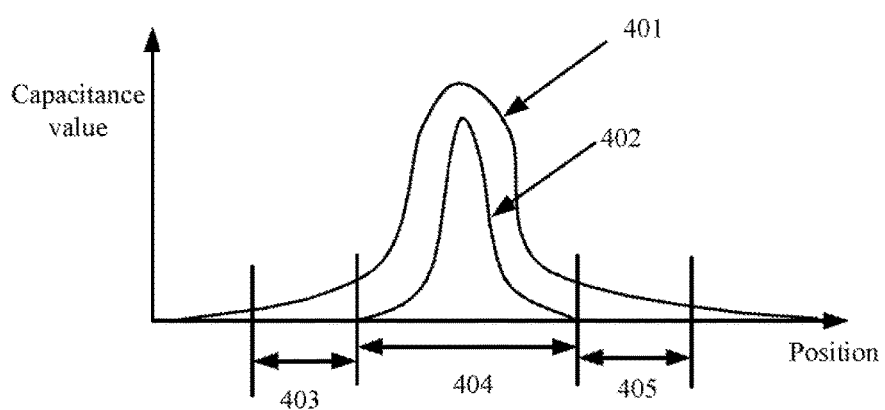
FIG. 4 is a schematic view showing the preferred embodiment of the present invention after the in-cell touch display 201 is pressed downwards.

FIG. 4 is a schematic view showing the preferred embodiment of the present invention after the in-cell touch display 201 is pressed downwards. Referring to FIG. 4, Y-axis represents the intensity, or the capacitance value, and X-axis represents the touched position. Symbol 401 represents the change of the capacitance sensing value caused by the finger and the exerted force or pressure on the touch sensing layer 302; and symbol 402 represents the change of the capacitance sensing value caused by only the finger on the touch sensing layer 302 (i.e., the exerted pressure is not included). As shown in FIG. 4, it is clearly obtained that the capacitance values include the capacitance sensing values caused by the finger on the touch sensing layer 302 in the position range of the symbol 404. In the position ranges of the symbol 403 and the symbol 405, the change of the capacitance sensing value only caused by the exerted force on the touch sensing layer 302 is included. In the embodiment of the present invention, the capacitances in the position range of the symbol 404 are preferably excluded for precisely acquiring the pressure value. Moreover, a portion of the capacitances in the position range of the symbol 404 may also be excluded for acquiring the pressure value.

Figure 5:
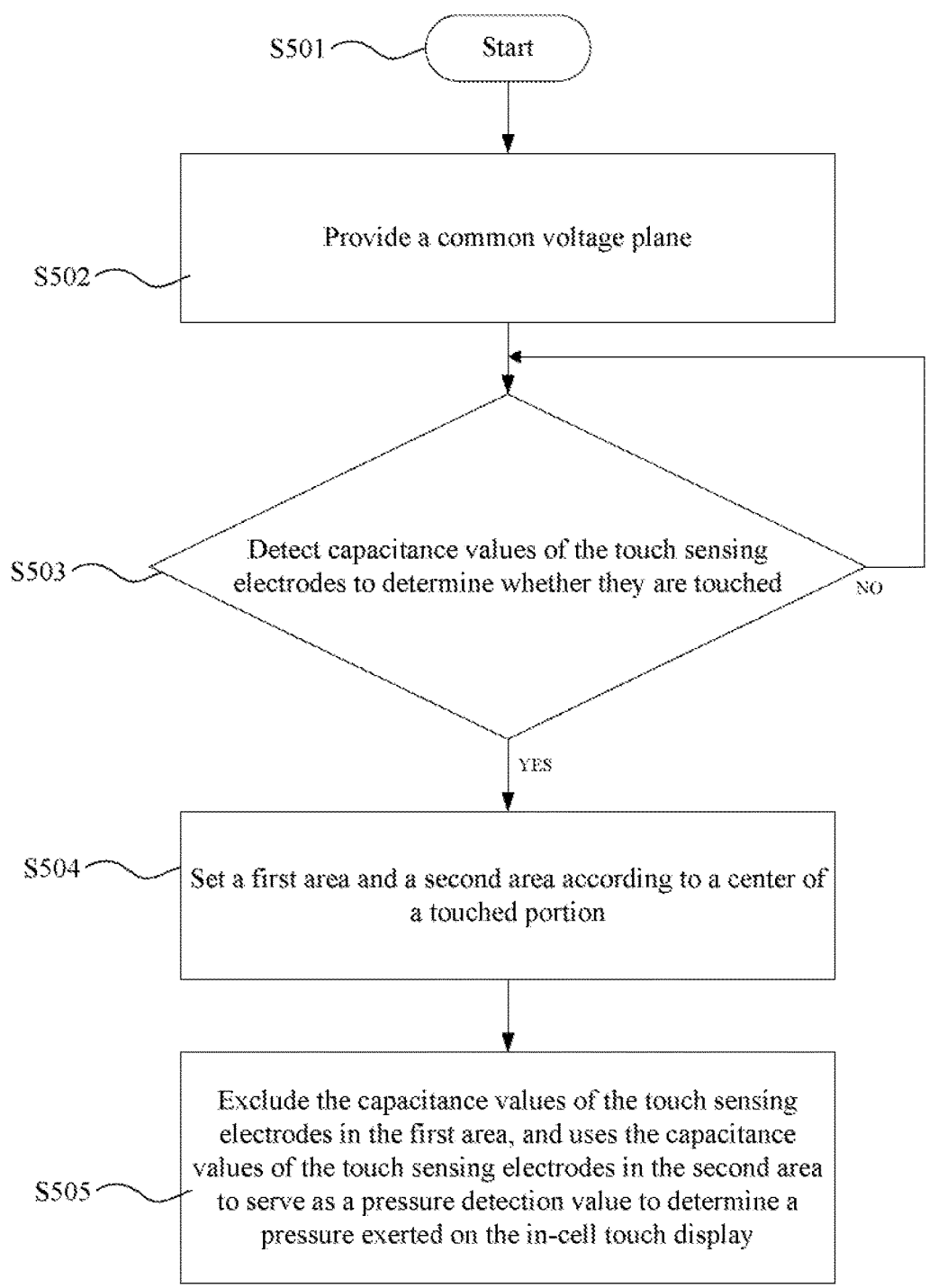
FIG. 5 is a flow chart showing a pressure detection method for an in-cell touch display according to a preferred embodiment of the present invention.

FIG. 5 is a flow chart showing a pressure detection method for an in-cell touch display according to a preferred embodiment of the present invention. Referring to FIG. 5, the pressure detection method for the in-cell touch display comprises the following steps.

In step S501, the method starts.

In step S502, a common voltage plane, corresponding to the touch sensing electrodes, is provided in correspondence with an in-cell touch display. For example, the common voltage plane may be the LCM bezel 305, or the metal casing of the mobile device.

In step S503, capacitance values of the touch sensing electrodes are detected to determine whether the touch sensing electrodes are touched. The IDC 202 detects each touch sensing electrode 204 to acquire the capacitance values of the touch sensing electrodes 204. When it is determined that the touch sensing electrodes 204 are not touched, the process returns to the step S503 to continue the determination. When the touch is determined, the process goes to step S504.

Figure 6A:
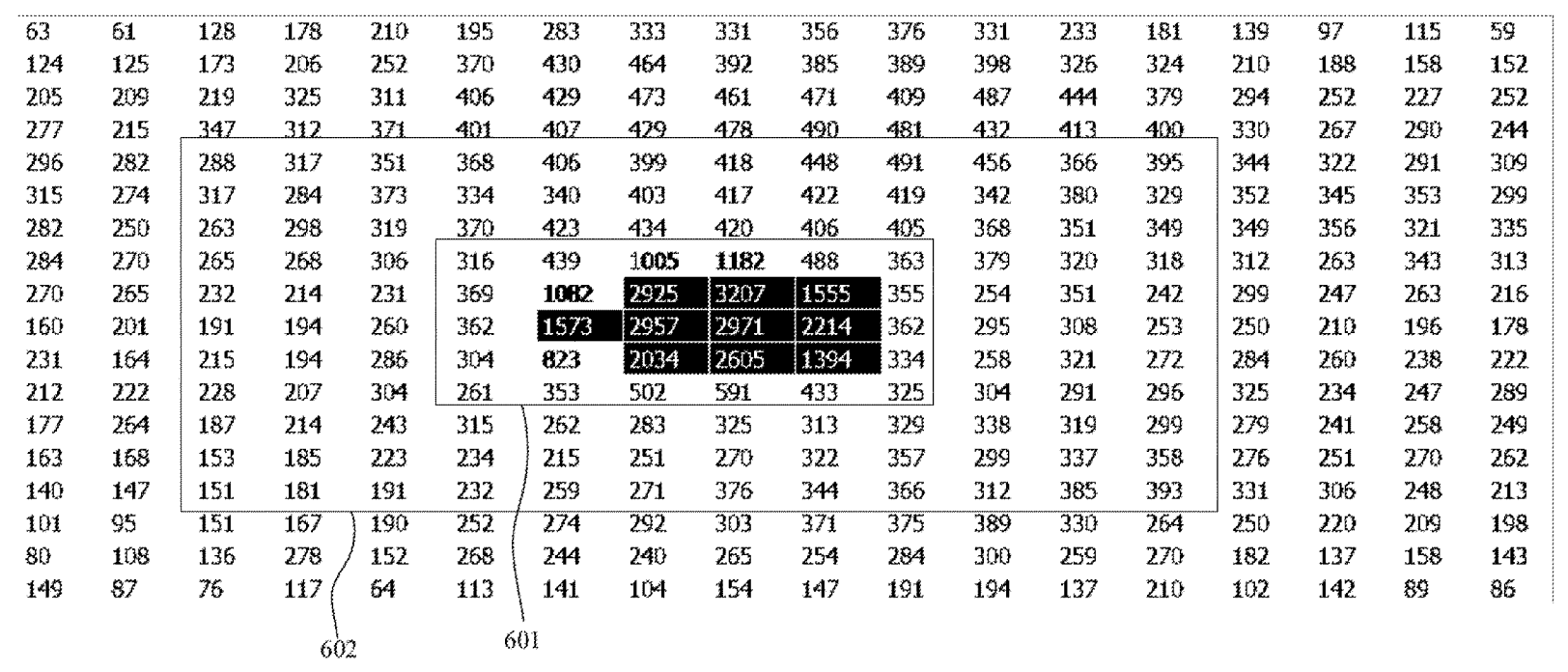
Figure 6B:
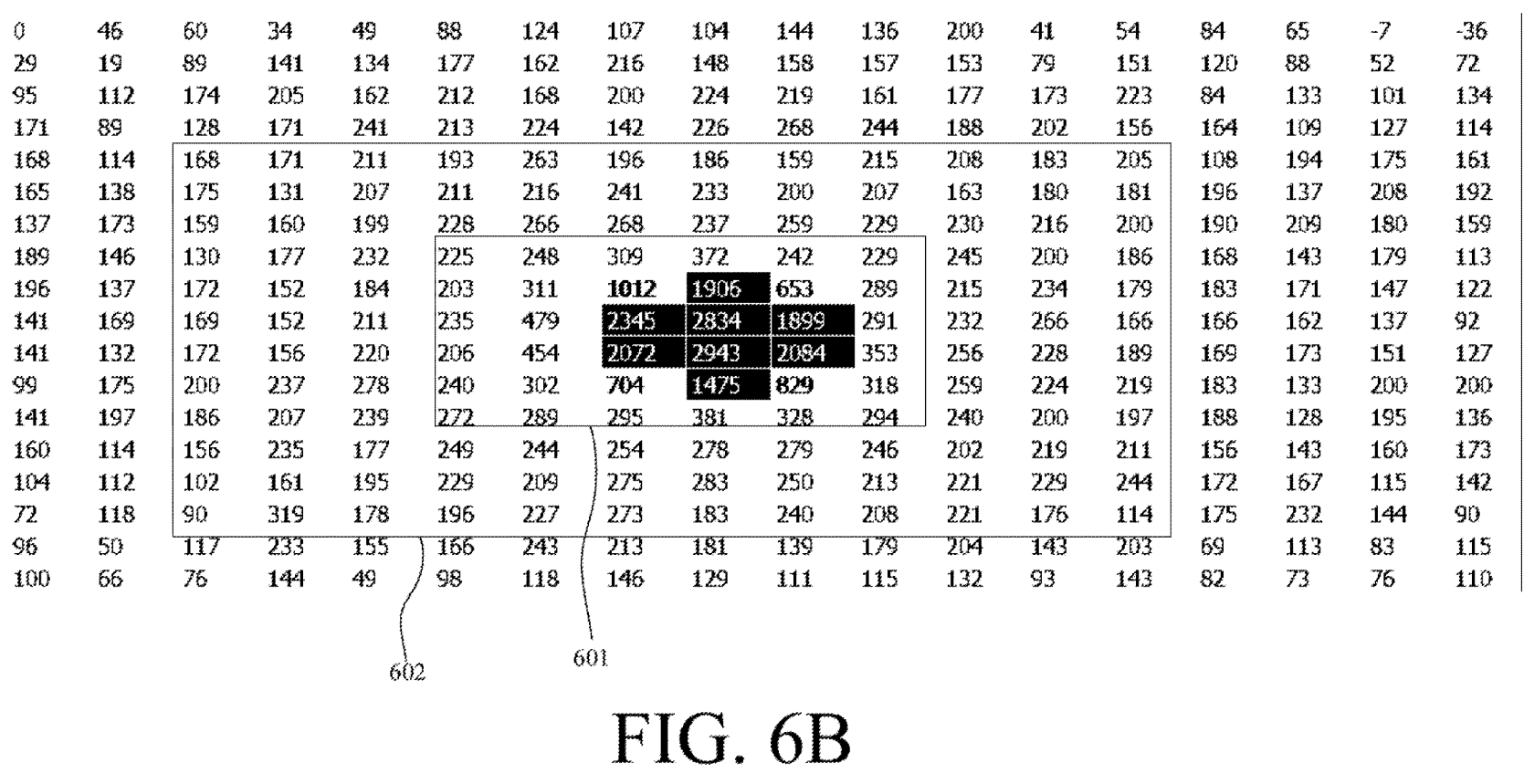
Figure 6C:
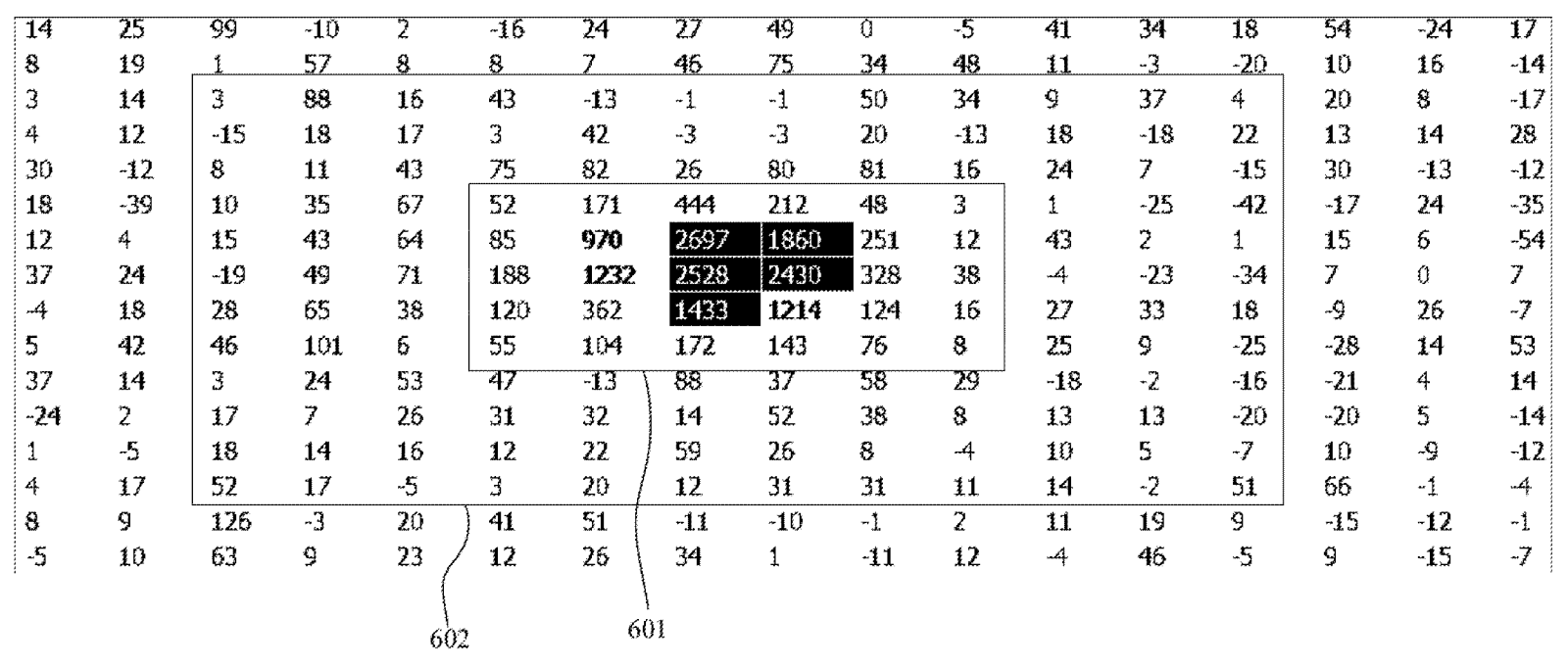

In the step S504, when the in-cell touch display is determined as being touched, a first area and a second area are set according to a center of a touched portion, wherein the second area includes the first area. FIG. 6A is a schematic view showing the capacitance values captured by the IDC 202 after the in-cell touch display 201 of the preferred embodiment of the present invention is pressed by the force of 500 grams. FIG. 6B is a schematic view showing the capacitance values captured by the IDC 202 after the in-cell touch display 201 of the preferred embodiment of the present invention is pressed by the force of 200 grams. FIG. 6C is a schematic view showing the capacitance values captured by the IDC 202 after the in-cell touch display 201 of the preferred embodiment of the present invention is pressed by the force of 10 grams. Referring to FIGS. 6A, 6B and 6C, those skilled in the art may observe that the detected capacitance value of the touch sensing electrode affected by the finger is much greater than the value affected by the pressure.

In order to eliminate the influence of the finger, a first area 601 and a second area 602 are firstly set after the center of the touched portion is determined. Generally speaking, the first area 601 comprises the value affected by the finger, but does not necessarily only contain the value affected by the finger. For example, the definition of the first area 601 may be a rectangular range constituted by the value greater than 300, or a predetermined range, but the present invention is not restricted thereto. The second area 602 includes or contains the first area 601, and has a range larger than that of the first area 601.

Figure 7:
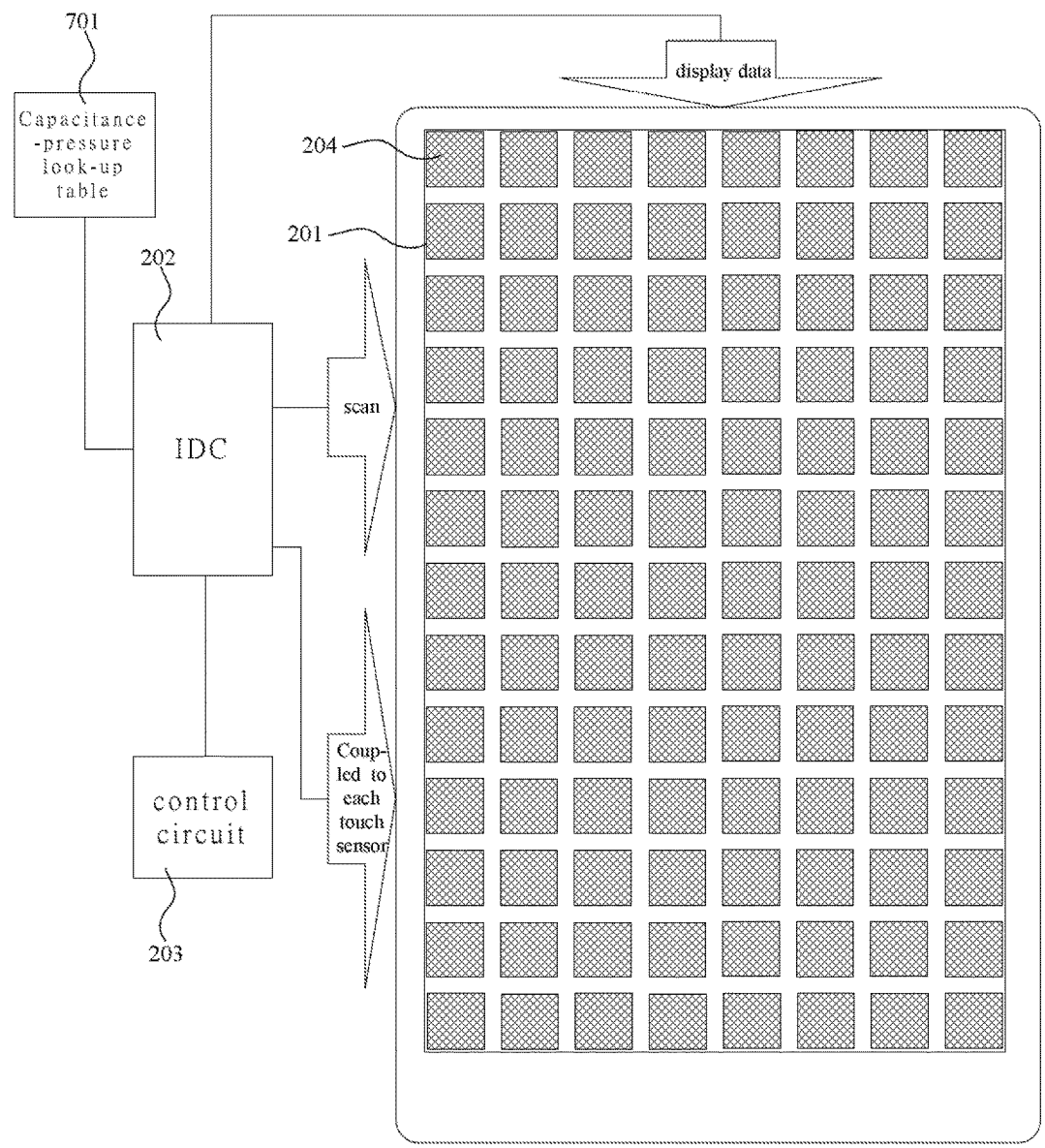
FIG. 7 is a circuit block diagram showing a mobile device according to a preferred embodiment of the present invention.

In step S505, the capacitance values of the touch sensing electrodes in the first area are excluded, and the remaining capacitance values of the touch sensing electrodes in the second area are used to serve as a pressure detection value to determine a pressure exerted on the in-cell touch display. In the step S505, for example, a capacitance-pressure look-up table may be used, as shown in FIG. 7. FIG. 7 is a circuit block diagram showing a mobile device according to a preferred embodiment of the present invention. In FIG. 7, a capacitance-pressure look-up table 701 is additionally added to the mobile device. The input of the capacitance-pressure look-up table 701 is the sum of the capacitance values of the step S505, and the output thereof is the pressure value. In addition to the use of the sum of the capacitance values of the step S505 to serve as the input of the capacitance-pressure look-up table 701, the average of the capacitance values of the step S505 may also be adopted. So, the present invention is not restricted thereto.

In addition, the above-mentioned exemplary embodiment excludes all the touch sensing electrodes in the first area 601, but those skilled in the art should know that the designer may also selectively design to exclude only a portion of the touch sensing electrodes in the first area 601. So, the present invention is not restricted thereto. In addition, the first area 601 and the second area 602 have the exemplary rectangular regions, but those skilled in the art should know that other geometric patterns or irregular patterns may be adopted to define the first area 601 and the second area 602, and the first area 601 and the second area 602 need not to have the same geometric shape. This is the optional design of the designer, so the present invention is not restricted thereto.

In the above-mentioned embodiment, the capacitance change caused by the finger (or charged body) is excluded to detect the capacitance change caused by the deformation of the embedded touch display panel, so that the pressure of the finger (or charged body) on the in-cell touch display is obtained. However, after the embedded touch display panel deforms, the glass substrate or protection glass has the poor resilience, for example, and the longer time is needed for the restoration to the original shape. If the embedded touch display panel has not yet restored to its original position and is again pressed down, then the deformation amount of the protection glass is smaller than that when the pressure is exerted at the first time, so the acquired capacitance value is also decreased. Thus, the present invention additionally provides a pressure detection method for calibrating the above-mentioned deformation erroneousness.

Figure 8:
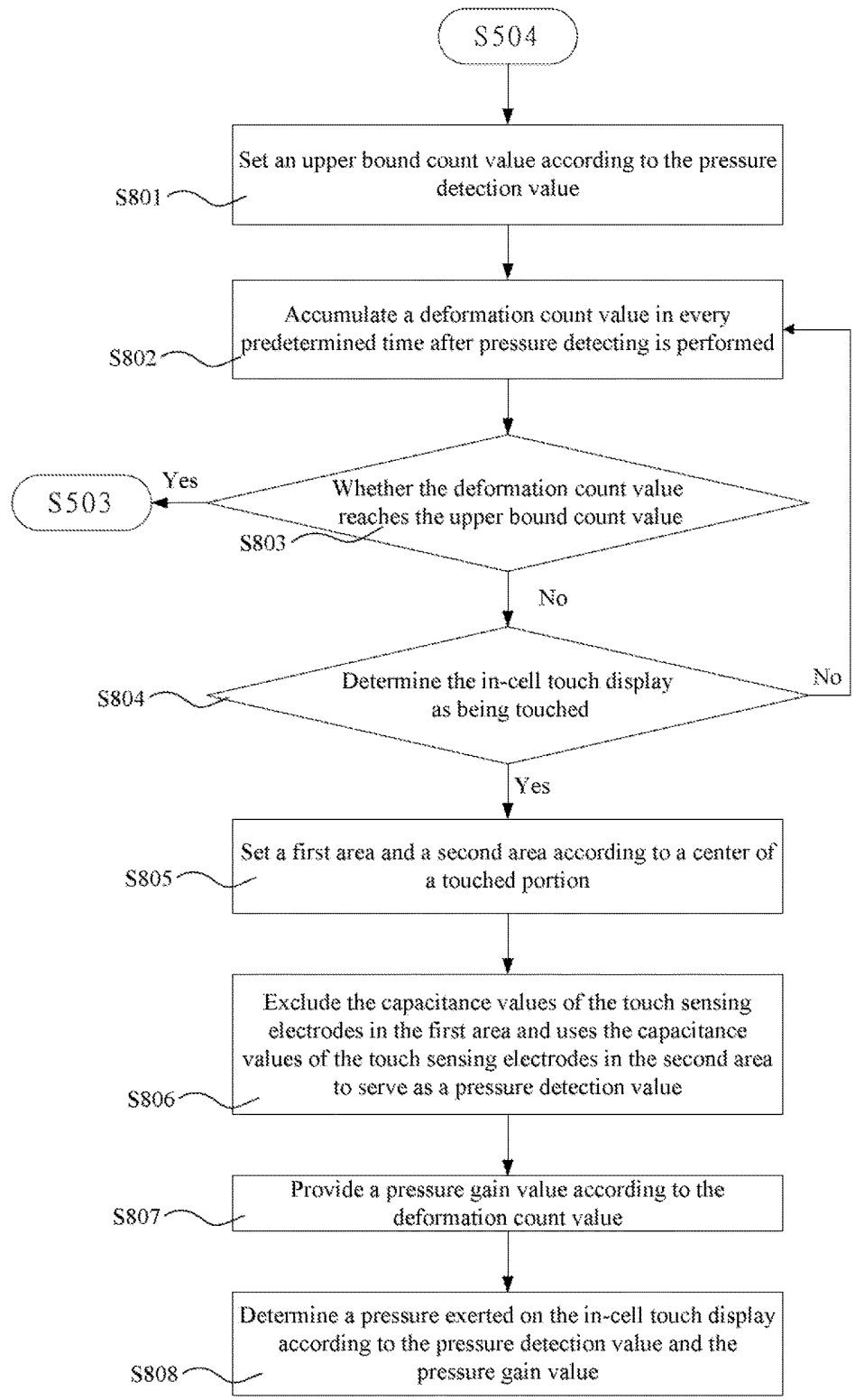
FIG. 8 is a flow chart showing a pressure detection method for an in-cell touch display according to a preferred embodiment of the present invention.

FIG. 8 is a flow chart showing a pressure detection method for an in-cell touch display according to a preferred embodiment of the present invention. Referring to FIG. 8, the pressure detection method for the in-cell touch display is to continue the step S504 of the pressure detection method of FIG. 5. The pressure detection method for the in-cell touch display comprises the following steps.

In step S801, an upper bound count value is set according to the previous pressure detection value.

Figure 9:
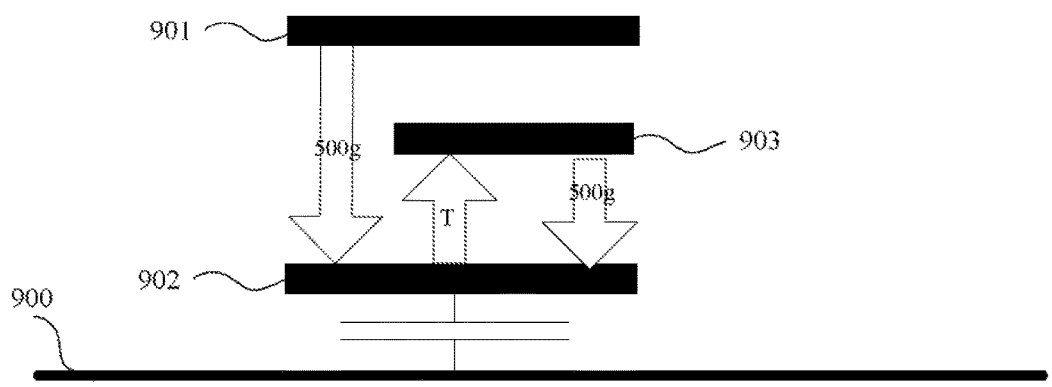
FIG. 9 is a schematic view showing the restoration after the in-cell touch display 201 of the preferred embodiment of the present invention is pressed.

In step S802, a deformation count value is accumulated in every predetermined time after pressure detecting is performed. FIG. 9 is a schematic view showing the restoration after the in-cell touch display 201 of the preferred embodiment of the present invention is pressed. Referring to FIG. 9, symbol 900 represents a reference plane, such as the LCM bezel 305. Symbol 901 represents the position of the touch sensing layer 302 when no pressure is applied. Symbol 902 represents the position of the touch sensing layer 302 when the pressing force of 500 G is applied at the first time. Symbol 903 represents the position of the touch sensing layer 302 after the pressing force of 500 G is applied and a predetermined time T is elapsed. As shown in FIG. 9, it is obtained that after the downward pressing force of 500 G is applied and if the time is not long enough, then the touch sensing layer 302 still cannot restore to the original position. In addition, the touch sensing layer 302 only can give the capacitance value according to the deformation amount. So, after the predetermined time T, the deformation amount of the touch sensing layer 302 after being pressed down by the force of 500 G at the second time is only one half of the deformation amount of the touch sensing layer 302 after being pressed down by the force of 500 G at the first time, and a gain value is thus needed to perform the correction to this deformation erroneousness.

In step S803, it is determined whether the deformation count value reaches the upper bound count value. If the determined result is negative, then step S804 is performed. If the determined result is affirmative, then the process goes back to the step S503. If the deformation count value reaches the upper bound count value, then it represents that the touch sensing layer 302 has restored to the original position. Therefore, this deformation erroneousness does not need the correction, and the process directly returns to the step S503. If the deformation count value has not reached the upper bound count value, then it represents that the touch sensing layer 302 has not restored to the original position. This deformation erroneousness needs the correction, and the process goes to the step S804.

In the step S804, before the deformation count value reaches the upper bound count value, it is determined whether the in-cell touch display has been touched again. If the determined result is negative, then the process returns to the step S802 to continue accumulating the deformation count value. If the determined result is affirmative, then the step S805 is performed.

In the step S805, when it is determined that the in-cell touch display is again touched, a first area and a second area are set according to a center of a touched portion, wherein the second area includes the first area.

In step S806, the capacitance values of the touch sensing electrodes in the first area are excluded, and the remaining capacitance values of the touch sensing electrodes in the second area are used to serve as a pressure detection value.

In step S807, a pressure gain value is provided according to the deformation count value. The pressure gain value may be implemented by a built in look-up table.

In step S808, a pressure exerted on the in-cell touch display is determined according to the pressure detection value and the pressure gain value.

In summary, the essence of the present invention is to determine the pressure of an external object pressing on the in-cell touch display by excluding an affect of touch capacitance of the external object such as a finger or other pressure exerting object itself according to the capacitance change caused by the sensing electrode against the distance change to the common voltage plane. Thus, the present invention utilizes the originally existing sensing electrode to detect the pressure of the external object on the in-cell touch display, so that a 3D touch experience can be further achieved without further adding a Z-axis sensing element.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A pressure detection method for an in-cell touch display, the method comprising the steps of:
   providing a common voltage plane corresponding to touch sensing electrodes in the in-cell touch display;
   detecting capacitance values of the touch sensing electrodes;
   setting a first area and a second area according to a center of a touched portion when the in-cell touch display is determined as being touched, wherein the second area includes the first area; and
   excluding at least a portion of the capacitance values of the touch sensing electrodes in the first area, and using the capacitance values of the touch sensing electrodes in the second area to serve as a pressure detection value to determine a pressure exerted on the in-cell touch display.

2. The pressure detection method according to claim 1, further comprising:
   accumulating a deformation count value in every predetermined time after pressure detecting is preformed;
   setting an upper bound count value according to the pressure detection value;
   determining whether the in-cell touch display is touched again before the deformation count value reaches the upper bound count value;
   setting the first area and the second area when the in-cell touch display is determined as being touched again according to the center of the touched portion, wherein the second area includes the first area;
   excluding the capacitance values of the touch sensing electrodes in the first area, and using the capacitance values of the touch sensing electrodes in the second area to serve as the pressure detection value;
   providing a pressure gain value according to the deformation count value; and
   determining a pressure exerted on the in-cell touch display according to the pressure detection value and the pressure gain value.

3. The pressure detection method according to claim 1, wherein the step of excluding the capacitance values of the touch sensing electrodes in the first area, and using the capacitance values of the touch sensing electrodes in the second area to serve as a pressure detection value to determine a pressure exerted on the in-cell touch display comprises:
   providing a reading-pressure look-up table; and
   inputting a sum of the captured capacitance values of the touch sensing electrodes to the reading-pressure look-up table to find a corresponding pressure value.

4. The pressure detection method according to claim 1, wherein the step of excluding the capacitance values of the touch sensing electrodes in the first area, and using the capacitance values of the touch sensing electrodes in the second area to serve as a pressure detection value to determine a pressure exerted on the in-cell touch display comprises:
   providing a reading-pressure look-up table; and
   inputting an average of the captured capacitance values of the touch sensing electrodes to the reading-pressure look-up table to find a corresponding pressure value.

5. The pressure detection method according to claim 1, wherein the common voltage plane comprises a pressure sensing layer.

6. The pressure detection method according to claim 5, wherein the pressure sensing layer comprises a metal frame or an electroconductive layer.

7. A mobile device, comprising:
   an in-cell touch display, comprising scan lines, touch sensing electrodes and a common voltage plane corresponding to the touch sensing electrodes;
   an integrated driver and controller (IDC) comprising pins coupled to the scan lines and the touch sensing electrodes, respectively, wherein,
   the IDC detects capacitance values of the touch sensing electrodes;
   when the in-cell touch display is determined as being touched, the IDC sets a first area and a second area according to a center of a touched portion, wherein the second area includes the first area; and
   the IDC excludes at least a portion of the capacitance values of the touch sensing electrodes in the first area, and uses the capacitance values of the touch sensing electrodes in the second area to serve as a pressure detection value to determine a pressure exerted on the in-cell touch display.

8. The mobile device according to claim 7, further comprising:
   a reading-pressure look-up table storing corresponding relationships between the capacitance values and pressure values,
   wherein the IDC inputs a sum of the capacitance values of the touch sensing electrodes to the reading-pressure look-up table to find a corresponding one of the pressure values.

9. The mobile device according to claim 7, further comprising:
   a reading-pressure look-up table storing corresponding relationships between the capacitance values and pressure values,
   wherein the IDC averages the captured capacitance values of the touch sensing electrodes to obtain an average, and then inputs the average to the reading-pressure look-up table to find a corresponding one of the pressure values.

10. The mobile device according to claim 7, wherein:
    the IDC accumulates a deformation count value in every predetermined time after pressure detecting is performed, and sets an upper bound count value according to the pressure detection value;
    the IDC further determines whether the in-cell touch display is touched again before the deformation count value reaches the upper bound count value, sets the first area and the second area according to the center of the touched portion when the in-cell touch display is determined as being touched again, wherein the second area includes the first area, excludes the capacitance values of the touch sensing electrodes in the first area, and uses the capacitance values of the touch sensing electrodes in the second area to serve as the pressure detection value; and the IDC provides a pressure gain value according to the deformation count value, and determines a pressure exerted on the in-cell touch display according to the pressure detection value and the pressure gain value.

* * * * *